(12) United States Patent
Beechy et al.

(10) Patent No.: US 9,709,175 B2
(45) Date of Patent: Jul. 18, 2017

(54) VALVE HAVING REDUCED OPERATING FORCE AND ENHANCED THROTTLING CAPABILITY

(71) Applicant: Akron Brass Company, Wooster, OH (US)

(72) Inventors: David Beechy, Sugarcreek, OH (US); Kevin Petit, Wooster, OH (US); Nelsimar Vandelli, Wooster, OH (US)

(73) Assignee: Akron Brass Company, Wooster, OH (US)

( * ) Notice: Subject to any disclaimer, the term of this patent is extended or adjusted under 35 U.S.C. 154(b) by 10 days.

(21) Appl. No.: 14/689,485

(22) Filed: Apr. 17, 2015

(65) Prior Publication Data

US 2015/0219224 A1    Aug. 6, 2015

Related U.S. Application Data

(63) Continuation of application No. 13/287,039, filed on Nov. 1, 2011, now Pat. No. 9,038,988.

(60) Provisional application No. 61/408,942, filed on Nov. 1, 2010, provisional application No. 61/416,350, filed on Nov. 23, 2010.

(51) Int. Cl.
| | |
|---|---|
| *F16K 5/06* | (2006.01) |
| *F16K 5/10* | (2006.01) |
| *F16K 5/20* | (2006.01) |
| *F16K 27/06* | (2006.01) |

(52) U.S. Cl.
CPC .............. *F16K 5/0605* (2013.01); *F16K 5/10* (2013.01); *F16K 5/20* (2013.01); *F16K 27/067* (2013.01)

(58) Field of Classification Search
CPC ........ F16K 27/067; F16K 5/0605; F16K 5/20; F16K 5/10
See application file for complete search history.

(56) References Cited

U.S. PATENT DOCUMENTS

| | | | |
|---|---|---|---|
| 2,545,220 A | 3/1951 | Wolcott, Jr. | |
| 2,765,142 A | 10/1956 | Ludeman | |
| 3,617,025 A | 11/1971 | Gerbic et al. | |
| 3,689,027 A | 9/1972 | Grenier | |
| 3,722,859 A | 3/1973 | Murphy et al. | |
| 3,784,155 A | 1/1974 | Tomlin | |
| 3,817,117 A | 6/1974 | Kita et al. | |
| 4,103,868 A | 8/1978 | Thompson | |
| 4,346,730 A * | 8/1982 | Gardner ................ | F16K 5/0605 137/375 |
| 4,423,749 A | 1/1984 | Schmitt | |
| 4,542,878 A | 9/1985 | Kulisek | |
| 5,435,521 A | 7/1995 | Jarecki | |
| 5,979,873 A | 11/1999 | Wu | |

(Continued)

*Primary Examiner* — Marina Tietjen
*Assistant Examiner* — Daphne M Barry
(74) *Attorney, Agent, or Firm* — Tucker Ellis LLP

(57) ABSTRACT

One or more techniques and/or systems are disclosed for a flow control valve element, which may comprise a generally spherical shape. An inlet and outlet are formed in the element, with a fluid passage disposed between. The respective inlet and outlet are defined by a lip, and at least the outlet has a lip face comprising a width less than that of an adjacent element wall thickness. The element can comprise a pair of opposing flats formed in the wall, where the flats respectively comprise an external flat portion of the element wall and an opposing internal flat portion of the element wall.

17 Claims, 8 Drawing Sheets

(56) References Cited

U.S. PATENT DOCUMENTS

| | | |
|---|---|---|
| 5,988,220 A | 11/1999 | Sakaki |
| 6,173,940 B1 | 1/2001 | Kardohely et al. |
| 6,412,756 B1 * | 7/2002 | Hayduk .................. B01J 8/003 251/315.1 |
| 2003/0205685 A1 | 11/2003 | Whang |
| 2011/0253922 A1 | 10/2011 | Hughes et al. |

* cited by examiner

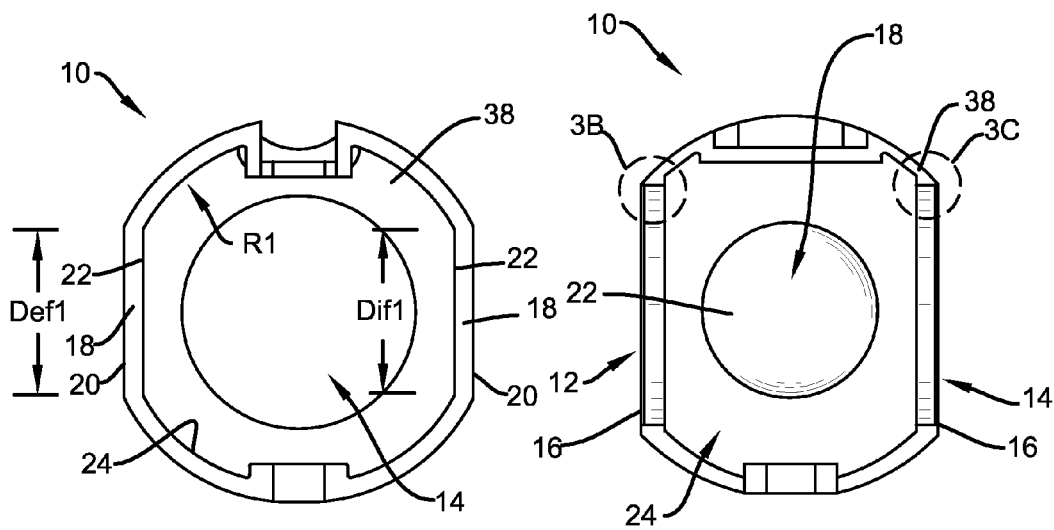
FIGURE 2
FIGURE 3A
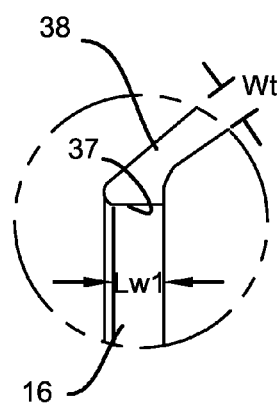
FIGURE 3B
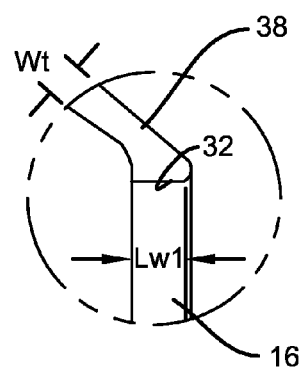
FIGURE 3C

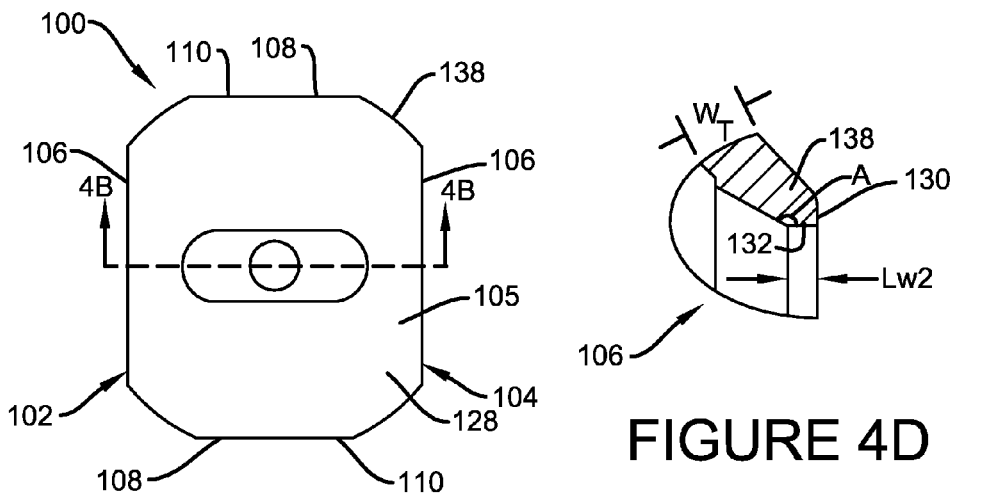
FIGURE 4A
FIGURE 4D
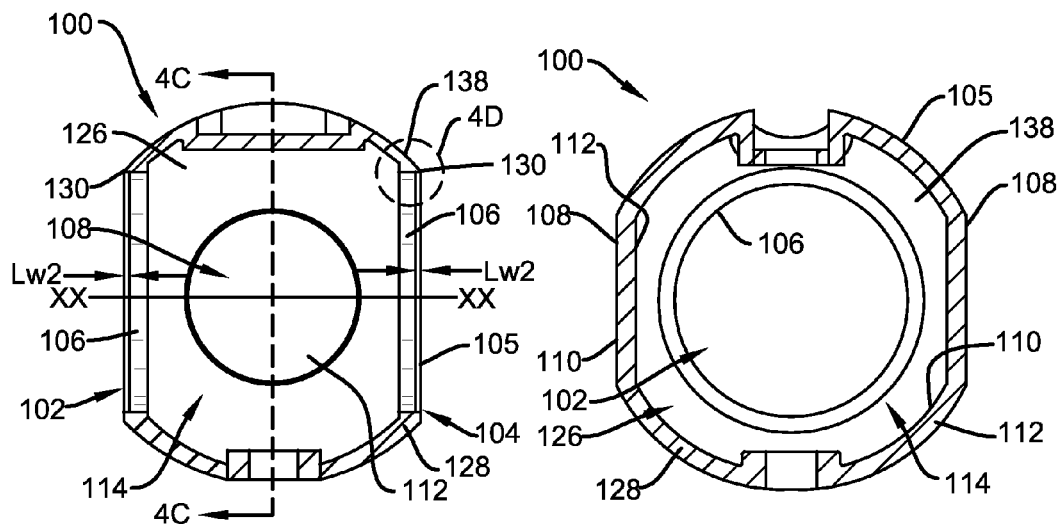
FIGURE 4B
FIGURE 4C

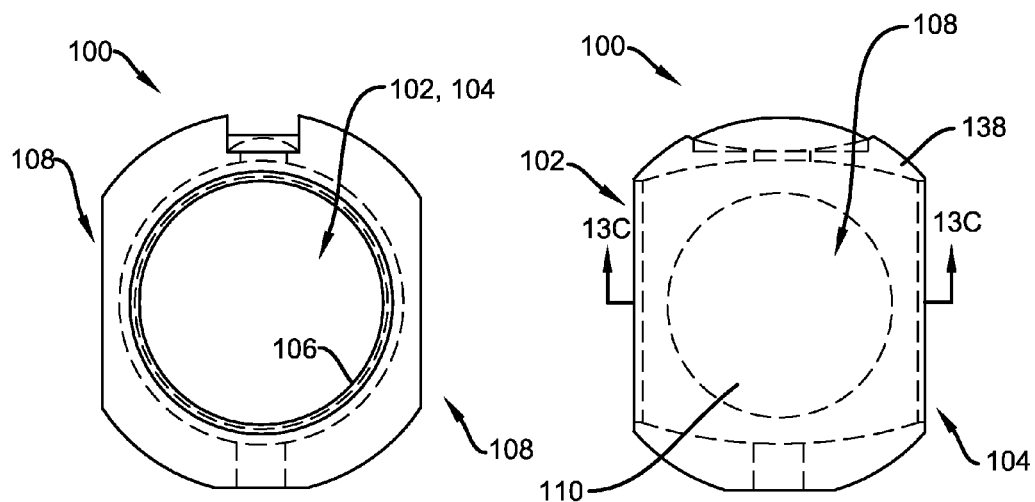
FIGURE 13A    FIGURE 13B
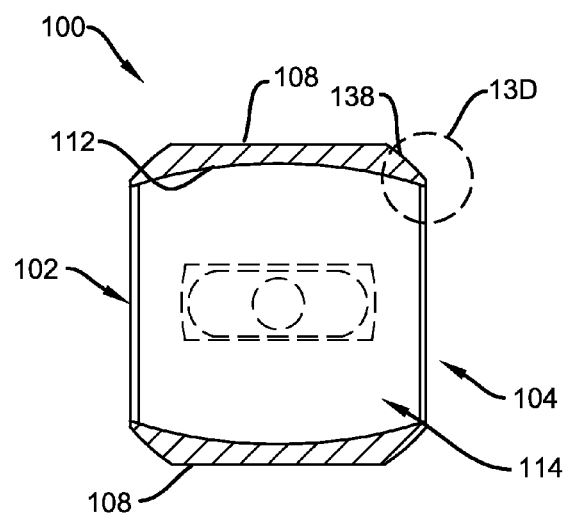 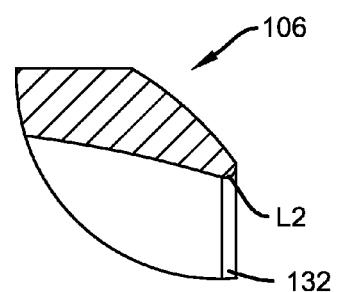
FIGURE 13C    FIGURE 13D

VALVE HAVING REDUCED OPERATING FORCE AND ENHANCED THROTTLING CAPABILITY

CROSS-REFERENCE TO RELATED APPLICATIONS

This application is a continuation of, and claims priority to, U.S. Ser. No. 13/287,039, entitled VALVE HAVING REDUCED OPERATING FORCE AND ENHANCED THROTTLING CAPABILITY, filed Nov. 1, 2011, which claims priority to U.S. provisional application 61/408,942, filed Nov. 1, 2010 and U.S. provisional application 61/416,350, filed Nov. 23, 2010, the entire contents of each application incorporated herein by reference.

BACKGROUND

In flow control valves a device is utilized as the flow-controlling element, and may be provided in a variety of forms. The flow-control element may be actuated manually, or by other suitable indirect or powered means, and is typically positioned inside the valve so that the flow of fluids (e.g., including liquids, gases and plasma) can be modulated according to various application-specific requirements. In operation, the flow control element can be subjected to forces and moments from the fluids. These fluid forces and moments are a function of fluid pressure and flow rate. Appropriate actuation forces and moments are used to overcome the fluid forces and moments to provide for effective modulation of flow.

A typical flow-controlling element designs, such as a conventional ball valve, can change position (e.g., "drift") when the ball is placed in some "throttled" position between fully open and fully closed. Some valves attempt to mitigate this tendency by providing a tighter friction fit between the ball and a complementary mating surface of a valve housing or body, called a "seat," to maintain the valve ball in a desired position. Likewise, friction in a valve manual control handle assembly, and hydraulic forces internal to the valve ball, may be utilized to facilitate the valve assembly with maintaining the valve ball position in select fluid-flow positions.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more implementations of a flow controlling element is disclosed herein. One or more flow-controlling element can be configured to reduce forces and moments that may be exerted by a fluid on the flow controlling element (e.g., a ball element) in a flow control valve. For example, the reduction of forces and moments on the ball element may reduce the forces and moments used to position the flow controlling element during actuation, thereby reducing an amount of forces and moments used to manually, or by other means, position the flow controlling element as desired and maintain that desired position for an amount of time. The reduction in fluid forces and moments exerted on the flow controlling element may allow the control valve to modulate higher flows.

In one implementation, a spherically-shaped valve flow control device can comprise a a fluid passage disposed along a first axis. Further, the flow control device can comprise an inlet disposed on the first axis, and an outlet disposed on the first axis. Additionally, the outlet may be fluidly coupled to the inlet by the fluid passage. A boundary of the outlet can be defined by a face of an outlet lip; and a cross-section of the outlet lip face may lie substantially parallel to the first axis. A width of the outlet lip face can be less than a thickness of a first wall that terminates at the outlet lip.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 2 is a view in section of an example implementation of a flow control valve ball;

FIG. 3A is a view in section of an example implementation of a flow control valve ball;

FIG. 3B is an enlarged partial view of a portion of an example implementation of a flow control valve ball;

FIG. 3C is an enlarged partial view of a portion of an example implementation of a flow control valve ball;

FIG. 4A is a side elevational view of an example implementation of a flow control valve ball;

FIG. 4B is a view in section of an example implementation of a flow control valve ball;

FIG. 4C is a view in section of an example implementation of a flow control valve ball;

FIG. 4D is an enlarged partial view of a portion of an example implementation of a flow control valve ball;

FIG. 13A is an end elevational view of an example implementation of a flow control valve ball;

FIG. 13B is a side elevational view of an example implementation of a flow control valve ball;

FIG. 13C is a view in section of an example implementation of a flow control valve ball;

FIG. 13D is an enlarged partial view of at least a portion of an example implementation of a flow control valve ball.

DETAILED DESCRIPTION

Figure 1A:
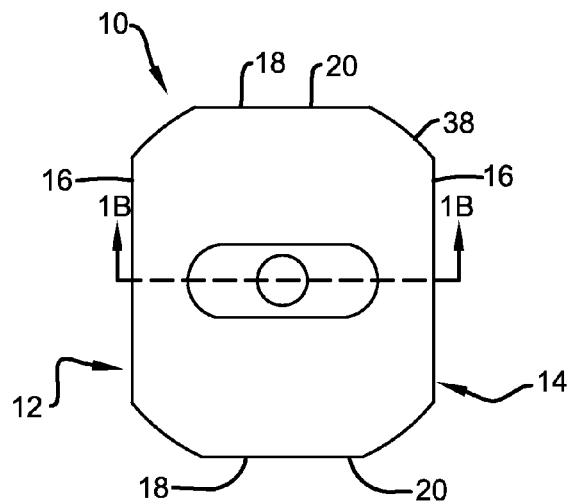
FIG. 1A is a side elevational view of an example implementation of a flow control valve ball.
Figure 1D:
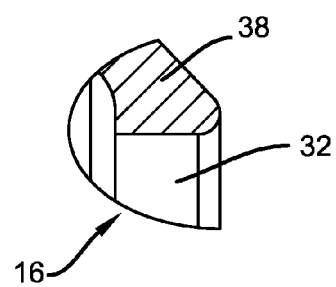
FIG. 1D is an enlarged partial view of a portion of an example implementation of a flow control valve ball.
Figure 1B:
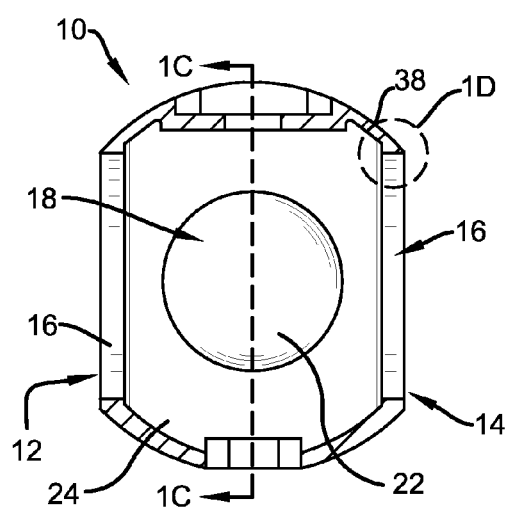
FIG. 1B is a view in section of an example implementation of a flow control valve ball.
Figure 1C:
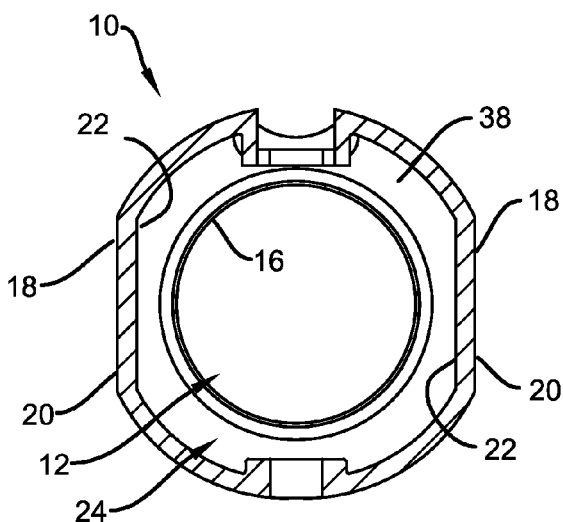
FIG. 1C is a view in section of an example implementation of a flow control valve ball.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

I. Flow Controlling Elements to Reduce Fluid Forces and Moments in Control Valves A conventional valve ball fluid flow controlling element (hereafter "conventional valve ball") 10 is shown in FIGS. 1A through 3C. Conventional valve ball 10 includes an inlet 12 and an opposing outlet 14, the inlet and outlet each having a lip 16, the face 32 of the lip respectively defining the inlet 12 and outlet 14; and the face 32 of the lip having a predetermined width Lw1. Conventional valve ball 10 further includes a pair of opposing flats 18, the flats having an external flat portion 20 and an internal flat portion 22. Conventional valve ball 10 further includes a hollowed-out portion 24, and a wall 38 formed between the internal and external portions of the ball, the wall 38 having a predetermined thickness Wt proximate the respective inlet and outlet. These features are summarized in Table 1 below, along with their controlling parameters.

TABLE 1

| Feature | Feature Ref. No. | Control Parameter | Parameter Symbol |
| --- | --- | --- | --- |
| Lip, Inlet and Outlet | 16 | Lip (Face 32) Width | Lw1 |
| External Flat Portion | 20 | External Flat Diameter | Def1 |
| Internal Flat Portion | 22 | Internal Flat Diameter | Dif1 |
| Hollowed-Out Portion | 24 | Internal Radius | R1 |

A. Increase in Valve Flow Control Capability

Figure 5:
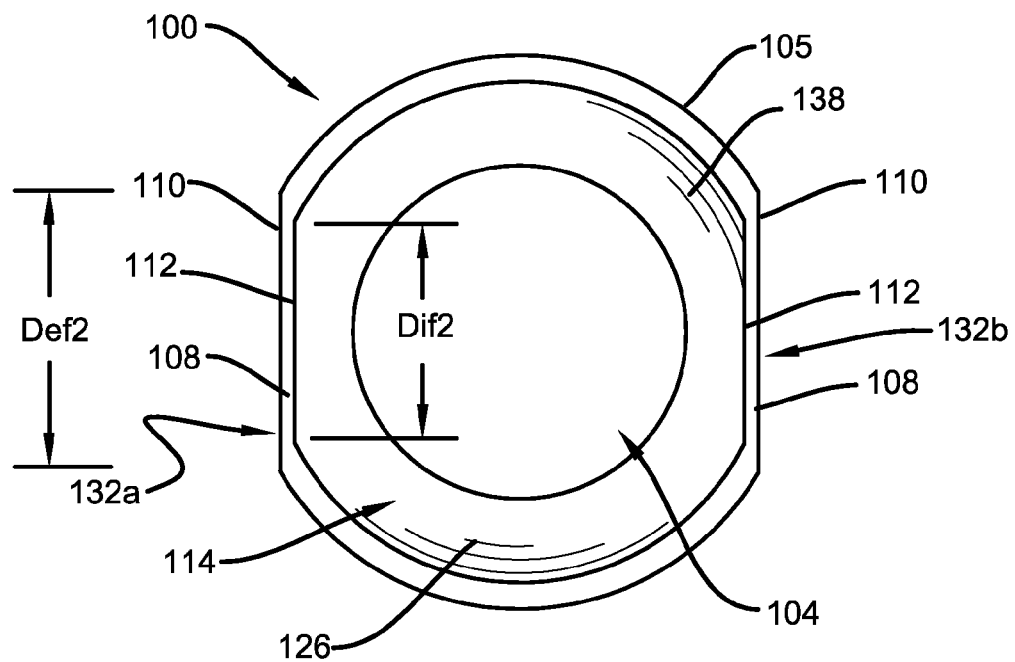
FIG. 5 is a view in section of an example implementation of a flow control valve ball.

A flow controlling element (hereafter "flow control element") 100 (e.g., a valve ball element) is shown in FIGS. 4A through 5 according to an embodiment of the present invention. Flow control element 100 includes an inlet 102 and an opposing outlet 104 formed in a generally spherical shape 105, the inlet and outlet each having a lip 106, respectively defined by a lip face 132 having a predetermined width Lw2. Flow control element 100 further includes a pair of opposing flats 108, respectively disposed on a first side 132a and a second side 132b, formed in the spherical shape 105, the flats having an external flat portion 110 and an internal flat portion 112. Flow control element 100 further includes a hollowed-out portion 114, defining a fluid flow passage, in the ball 105, and a wall 138 formed between the internal and external portions of the ball, the wall 138 having a predetermined thickness Wt proximate the inlet and the outlet. These features are summarized in Table 2 below, along with their controlling parameters.

TABLE 2

| Feature | Feature Ref. No. | Control Parameter | Parameter Symbol |
| --- | --- | --- | --- |
| Lip, Inlet and Outlet | 106 | Lip (Face 132) Width | Lw2 |
| External Flat Portion | 110 | External Flat Diameter | Def2 |
| Internal Flat Portion | 112 | Internal Flat Diameter | Dif2 |
| Hollowed-Out Portion | 114 | Internal Radius | R2 |

In one embodiment of the present invention enhanced throttling capability of valve ball element 100 can be achieved by adjusting parameters Def2 and Dif2 of either one or both of the flats 108. In particular, for example, for either or both flats 108, the diameter Def2 of external flat portion 110 can be increased and/or the diameter Dif2 of internal flat portion 112 can be reduced (e.g., or vice versa). Further, a ratio defining the relationship between the exterior dimension Def2 of external flat portion 110 and the internal dimension Dif2 of internal flat portion 112 may be used to describe the selected dimensions, which can be used to increase the flow area at seat openings of a valve in which the exemplary flow control element 100 is disposed. In this way, flow through the ball may be decreased, thus effectively reducing hydraulic forces that can cause drift. The flat ratio may be described generally as follows, in Equation 1:

$$\text{Ratio} = \text{Def2}/\text{Dif2} \qquad \text{Equation 1}$$

In one implementation, when the external and internal flat portions 110, 112 are respectively, generally circular in shape, an increase in the ratio between diameter Def2 and diameter Dif2 can result in an improvement in the flow controlling capability of the flow control element 100. All ratios of Def2/Dif2, ranging from zero (e.g., no external flat portion 110 when Def2=0) to infinity (i.e., no internal flat portion 112 when Dif2=0) are considered to be within the scope of the present invention.

Figure 6:
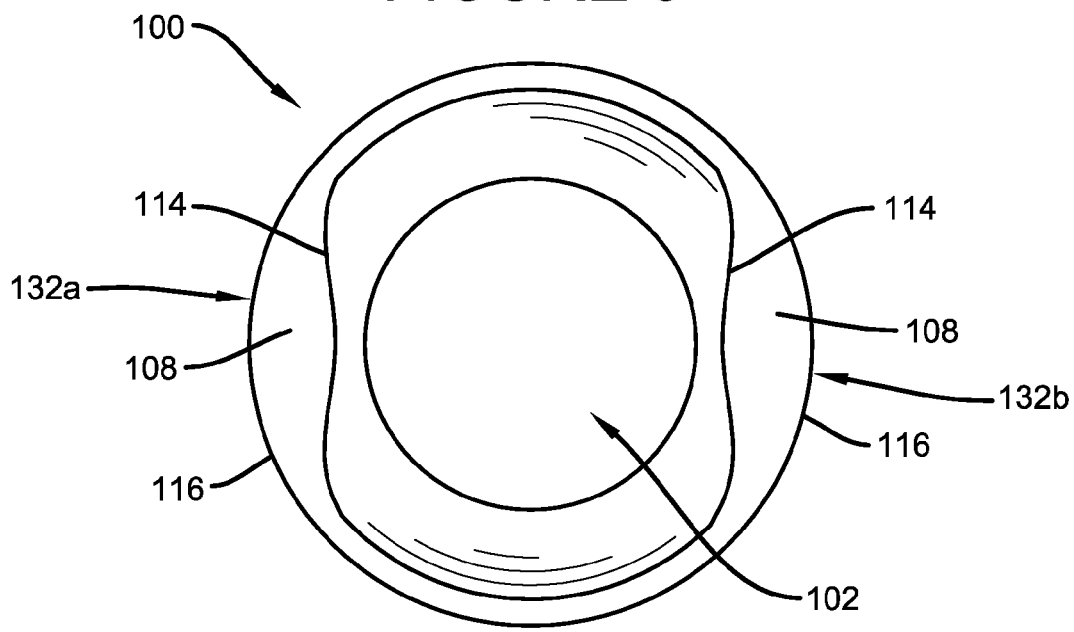
FIG. 6 is an illustration of example implementations of a flow control valve ball.

In some embodiments of the present invention either or both of the flats 108 respectively disposed on the first side 132a and the second side 132b, of valve ball element 100 may comprise alternate geometries, such as wherein the external flat portion 110 and/or internal flat portion 112 have a slight concave geometry 116 and/or a slight convex geometry 118 respectively, as shown in FIG. 6, for example. In other embodiments of the present invention external flat portions 110 of valve ball element 100 may comprise convex geometry 118 while internal flat portion 112 may comprise concave geometry 116. In still other embodiments of valve ball element 100, for either of the flats 108, merely one of external flat portion 110 and internal flat portion 112 of a flat 108 may comprise a concave or convex geometry 116, 118 respectively, where the other flat 108 may comprise a substantially planar geometry. In yet other embodiments of flow control element 100 either or both of the flats 108 may have merely one external and internal flat portion 110, 112 respectively (or no flat portions) as opposed to two external and two internal flat portions.

B. Modification of the Spherical Hollowed-Out Shape to an Elliptical Shape

Figures 7, 8:
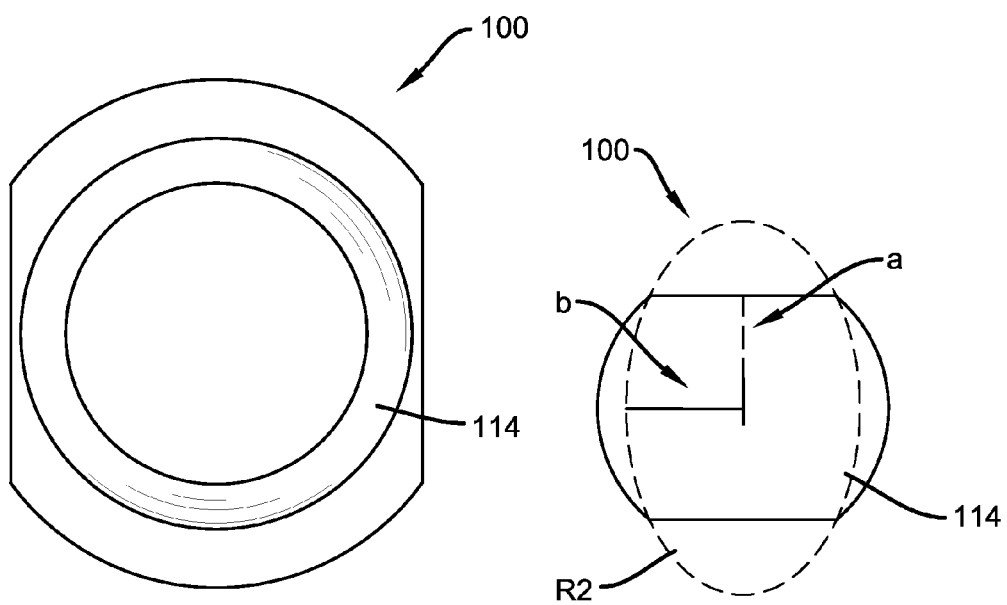
FIG. 7 is an illustration of an example implementation of a flow control valve ball.
FIG. 8 is an illustration of at least a portion of an example implementation of a flow control valve ball.

With reference to FIGS. 7 and 8, valve ball element 100 may be configured with a hollowed-out portion 114 having a shape "R2" parameter that can be defined by a set of major and minor axes "a" and "b" respectively as shown in FIG.

Figures 9, 10:
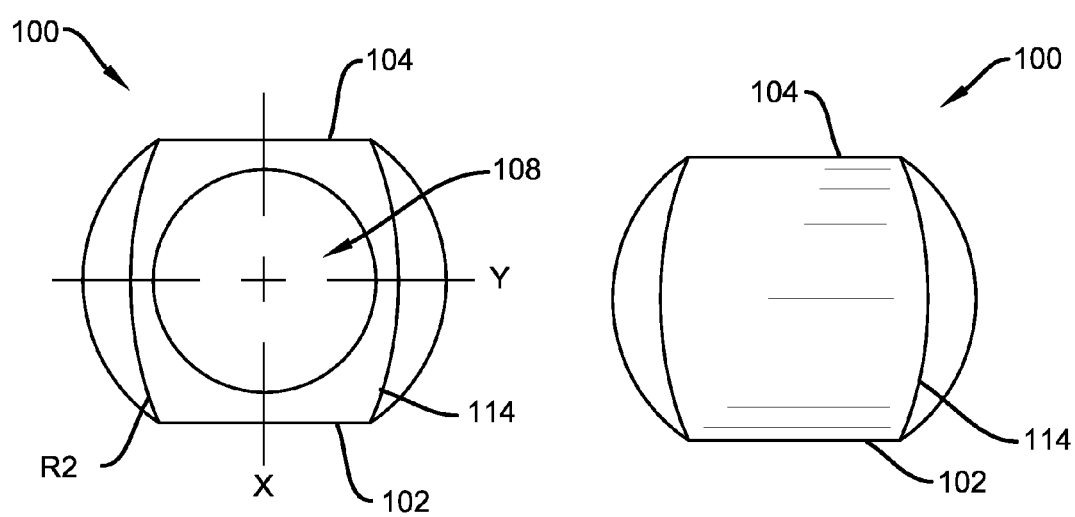
FIG. 9 illustrates parameters of an example implementation of a flow controlling element.
FIG. 10 illustrates an example implementation of a flow controlling element.

8, defining an ellipse (e.g., or ellipsoid in three-dimensions). In one implementation, as the minor axis length b approaches the major axis length a, the flow controlling capability of flow control element 100 may be improved. Stated another way, for example, an ellipsoid segment-shaped, hollowed-out portion 114 having a shape R2 may be envisioned as a material removal by revolving an ellipse around two axes of valve ball element 100, namely an axis "X" parallel to the flow and an axis "Y" perpendicular to the flow, as shown in FIG. 9. Shape R2 may be expressed by Equation 2, below:

$$R2=Y/X \qquad \text{Equation 2}$$

FIGS. 7-9 illustrate an embodiment where the ellipse defined by R2 is revolved around axis X, parallel to the flow of fluid through valve ball element 100. In one implementation, as the Y/X ratio (i.e., b/a ratio) of shape R2 is increased, the fluid forces and moments acting upon the flow control element 100 may be reduced. The present invention envisions all ratios of shape R2 ranging from approximately zero toward infinity, understanding that zero and infinity ratios cannot be materialized geometrically.

The present invention also anticipates all potential internal profiles of the hollowed-out portion 114 that are convex with variable curvature. In contrast, conventional valve ball 10 has a convex shape with constant curvature R1 (FIG. 2) as in the case of a spherical hollowed-out shape. In addition, other valve balls in the art may have no curvature at all as, in the case of a "straight-through" hollowed-out shape.

Furthermore, in some implementations, an example flow control element 100 may comprise concave shapes of hollowed-out portion 114 for a reduction in fluid forces and moments, as well as combinations of convex and concave shapes. In some implementations, an example flow control element 100 may comprise a same internal surfaces described above with through-holes positioned specifically to reduce the flow forces and moments. All variations of shape R2, axes of revolution and convex/concave shapes of hollowed-out portion 114 may be considered in combination with all the possible variations of the aspects of the present invention disclosed in section I.A above. Non-limiting example embodiments are shown in FIGS. 7, 8 and 9.

C. Inlet/Outlet Lip Width

With reference to FIG. 4B, in one aspect, as the width Lw2 of the lip face 132 of the lip 106 decreases, controllability of the flow control element 100 may improve. In one implementation, in this aspect, the width Lw2 of the lip face 132 of the lip 106 may be less than the thickness Wt of the wall 138 proximate the lip 106, for example, which may improve flow controlling capability. In another implementation, the flow control element 100 may comprise a lip 106 (e.g., outlet and/or inlet) that tapers toward the lip face 132. In one implementation, the taper may be a result of an angled wall portion of the lip 106, oriented at an angle A with respect to the lip face 132 (FIGS. 4B, 4D), for example, to improve the flow controlling capability of the flow control element. In some embodiments the flow control element 100 may be configured such that the lip face 132 of the lips 106 comprises a mere point, as illustrated in FIG. 10. Note also that flow control element 100 of FIG. 10 further includes an elliptical hollowed-out portion 114.

D. Waterway Structure

Figure 11:
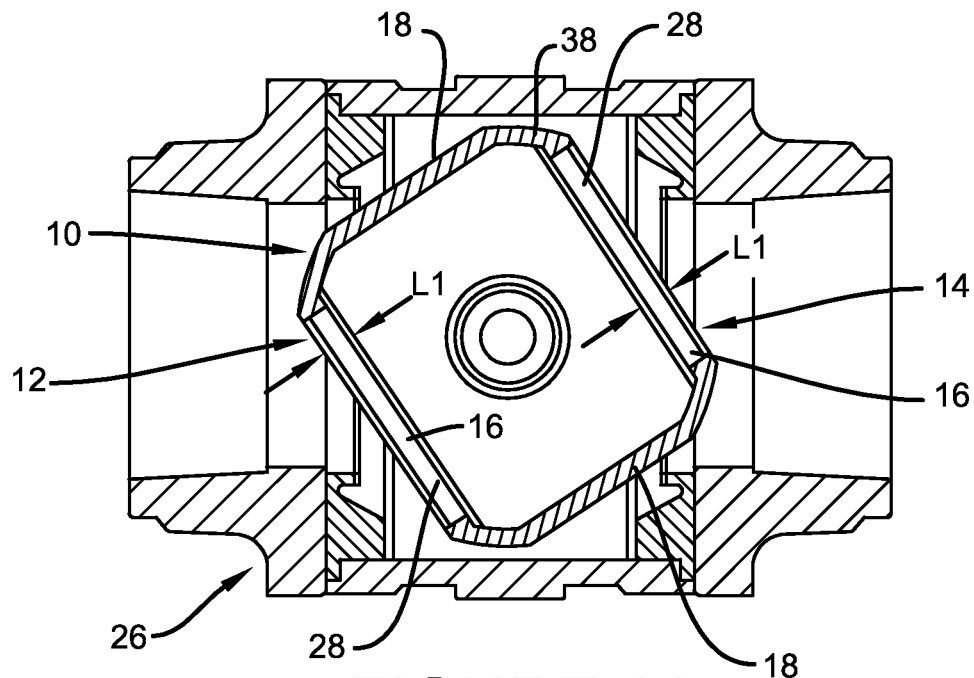
FIG. 11 is a view in section of an available valve assembly.
Figure 12:
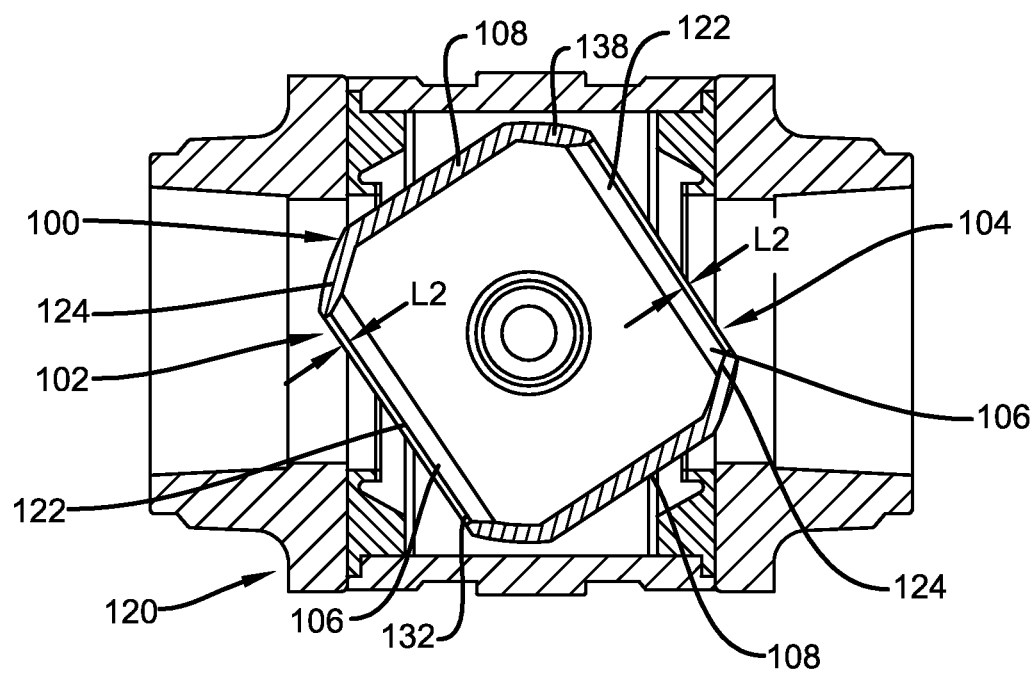
FIG. 12 is a view in section of an example implementation of a valve assembly.

In FIG. 11, a valve body 26 comprises a conventional valve ball 10 rotatably disposed therein. FIG. 12 illustrates and example valve body 120 comprising an exemplary flow control element 100 (e.g., ball element) rotatably disposed therein. With reference to FIG. 11, inlet 12 and outlet 14 of conventional valve ball 10 each include a waterway 28 having a length "L1," defined by the lip face 32. Likewise, with reference to FIG. 12, inlet 102 and outlet 104 of flow control element 100 respectively comprise a waterway 122 having a length L2, defined by the lip face 132. As an illustrative example, comparing FIGS. 11 with 12, waterway 122 has a reduced length compared to waterway 28 of the conventional valve ball 10. For example, the reduced length L2 of waterway 122 may enhances a pressure distribution on interior surfaces of flow control element 100, compared with the conventional valve ball 10.

In one implementation, the lip 106 of either or both of inlet 102 and outlet 104 of valve ball element 100 may comprise a chamfer 124, as shown in FIG. 12, for example, defining a tapering of the wall 138 to the lip face 132 of the lip 106. That is, for example, the lip 106 may be defined by a point on the wall 138 where the width of the wall 138 (e.g., Wt) begins to taper to the lip face 132. FIGS. 13A, 13B, 13C, and 13D illustrate an alternate implementation of the example flow control element 100. In this implementation, waterway length L2 is reduced to a nominal width of the lip face 132, which is reduced to a point on the lip 106. In this way, for example, the waterway 122 and chamfer 124 may be substantially removed, and pressure distribution about flow control element 100 can be improved.

II. Flow Controlling Elements to Reduce Friction Forces in Control Valves

In the art, there are a number of features that determine the friction force acting upon a valve ball flow controlling element. It is desirable to reduce the friction forces from other fixed or movable valve elements so that operating forces and moments acting on the valve ball flow controlling element can be optimized. Preferably, flow controlling elements are configured so that fluid forces and moments are reduced. Reducing friction forces allows the design of flow controlling elements with higher flow controllability and along with lower operating forces and moments.

As detailed further below, the present invention discloses surface finishes and shapes for a flow controlling element, for instance a valve ball, configured to reduce friction forces from other fixed or movable valve elements in flow control valves. The reduction of friction forces on the ball element allow the valve to reduce the forces and moments required to position the flow controlling element during actuation, thereby reducing the magnitude of forces and moments that must be produced manually or by any other means to position the flow-controlling element and maintain that position for a required amount of time.

A. Decrease in Surface Finish

In general, the lower the surface finish roughness, the lower the friction between ball and seats during operation between closed position and multiple partially open positions. This is generally referred to as "break-away torque." Friction between the fully-closed and any partially open position is referred to as an "operating torque" and includes movement between two partially open positions.

Figure 14:
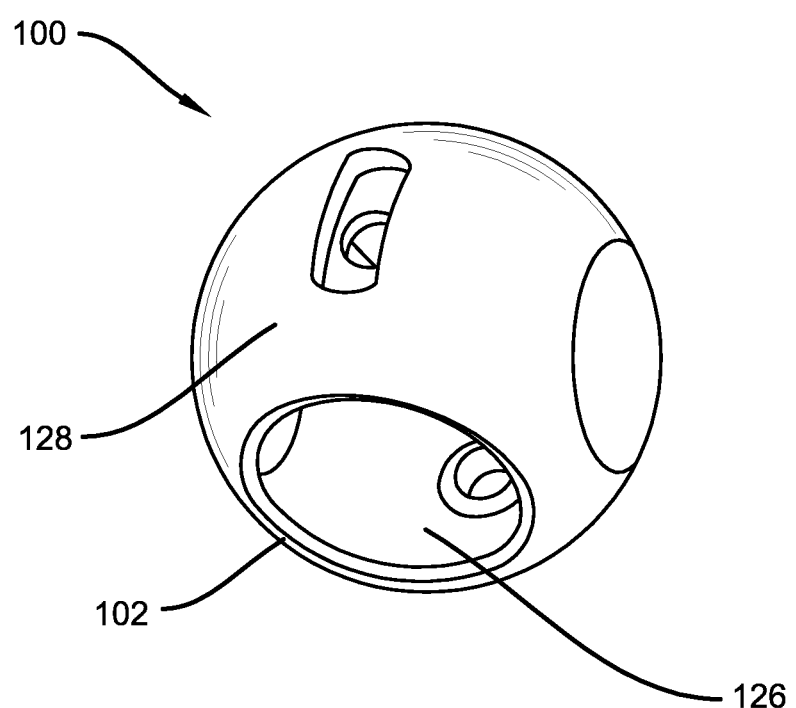
FIG. 14 is a view of an example implementation of a flow control valve ball.

With reference to FIG. 14, in some embodiments of the present invention valve ball element 100 includes a predetermined surface finish of one or more surfaces of the valve ball element. The present invention is directed to reductions in surface finish that include but are not limited to, a surface finish reduction from about 120 ˆ-inch to 32 ˆ-inch.

The disclosed invention also addresses directional surface finishes of valve ball element 100, including internal surfaces 126 and external body surfaces 128, and oriented at a desired angle with respect to the fluid flow direction from inlet 102 to outlet 104 (i.e., axis X of FIG. 9). In some embodiments a directional surface finish is oriented parallel and/or perpendicular to the fluid flow direction, with any suitable finish values up to about 250 ^-inch. Directional surface finishes may be utilized reduce friction forces acting upon valve body element 100 and to reduce flow forces and moments acting upon the valve body element.

This aspect of the present invention, in all its different variations regarding surface finish may be considered in combination with all the possible variations of aspects of the present invention detailed above in sections I.A, I.B, and I.C.

B. Increase Exterior Geometry Blend Radius

In one aspect, an increase in an exterior blend radius of the lip 106 can result in a decrease of the friction between a flow control element and an adjacent valve seat, for example, upon disposing the flow control element in a closed position. In this aspect, for example, a desirable blend radius of the lip 106 can provide for improved movement of the ball past the valve seats, and thus reduce and effort used to operate the valve. This is generally referred to as the "re-seating torque."

As illustrated in FIGS. 4A, 4B 4C and 4D, the flow control element 100 can comprise a blend radius 130. In this implementation, the blend radius 130 may comprise a convex curve intermediate the lip face 132 of the lip 106, and an external portion of ball 105. As an example, the blend radius 130 may be disposed at the inlet 102 and/or the outlet 104. In some embodiments blend radius 130 may comprise a range from about 1/16 inch to about 5/32 inch, though greater and lesser radii are anticipated.

III. Conclusion

As described herein, various shapes of flow control elements may be used in control valves. In one embodiment, one or more shapes of flow control elements (e.g., valve balls) can be used in control valves utilized to control water flow in the fire suppression industry, although the one or more systems, devices and apparatus described herein may be utilized for any application and in any industry that uses a specific component as the flow control element. In addition, the one or more systems, devices and apparatus described herein may be used with any suitable control valves that are operated manually or by any other means. The one or more example flow control elements may be sized to suit a particular application, as applicable. Furthermore, any suitable materials may be selected for the flow controlling elements using sound engineering means. Any suitable manufacturing and/or assembly process now known or later invented may be employed to produce the example flow control elements. The flow controlling elements may be utilized to control the flow of any type of fluid.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A spherically shaped valve flow control device, comprising:

a fluid passage disposed along a first axis;

an inlet disposed on the first axis, a boundary of the inlet defined by a face of an inlet lip, a cross-section of the inlet lip face lying substantially parallel to the first axis, and a width of the inlet lip face is less than a thickness of a first wall that terminates at the inlet lip, and the inlet defined by a face of the inlet lip, the inlet lip face disposed substantially parallel to the first axis, and the width of the inlet lip face is less than a thickness of a second wall that terminates at the inlet lip; and an outlet disposed on the first axis and fluidly coupled to the inlet by the fluid passage, a boundary of the outlet defined by a face of an outlet lip, a cross-section of the outlet lip face lying substantially parallel to the first axis, and a width of the outlet lip face is less than a thickness of a first wall that terminates at the outlet lip, one or more of the outlet lip and inlet lip comprising a blend curve radius disposed between the corresponding lip face and the outside portion of the corresponding wall.

2. The device of claim 1, the outlet lip defined by an outlet taper point and the outlet lip face, the taper point comprising a location on the first wall that begins a taper toward the outlet lip face.

3. The device of claim 2, the outlet lip comprising a chamfer disposed on an inside portion of the outlet lip between the outlet taper point and the outlet lip face.

4. The device of claim 1, the inlet lip defined by an inlet taper point and the inlet lip face, the inlet taper point comprising a location on the second wall that begins a taper toward the inlet lip face.

5. The device of claim 1, comprising a first side and a second side respectively disposed on a second axis, the second axis lying perpendicular to the first axis, the first side and second side respectively comprising a planar internal surface disposed in the fluid passage, and a planar external surface.

6. The device of claim 5, the respective internal surfaces comprising one of:
 a surface area that is less than a surface area of the respective external surfaces; and
 a surface area that is greater than a surface area of the respective external surfaces.

7. The device of claim 1, comprising a first side and a second side respectively disposed on a second axis, the second axis lying perpendicular to the first axis, the first side and second side respectively comprising an internal surface disposed in the fluid passage, and an external surface, and:
 the respective internal surfaces comprise one of:
  a convex topology; and
  a concave topology; and
 the respective external surfaces comprise one of:
  a convex topology; and
  a concave topology.

8. The device of claim 1, comprising a top side and bottom side respectively disposed on a third axis, the third axis lying perpendicular to the first axis and a second axis that is perpendicular to the first axis.

9. The device of claim 8:
 the third axis comprises an axis of rotation for the device; or
 the second axis comprises an axis of rotation for the device.

10. A valve component for controlling fluid flow, comprising:
 a fluid passage disposed along a first axis;
 a first side disposed on a second axis, the second axis lying perpendicular to the first axis;
 a second side disposed on the second axis opposite the first side,
 the first side and second side respectively comprising an internal surface disposed in the fluid passage, and an external surface;
 a top side and bottom side respectively disposed on a third axis, the third axis lying perpendicular to the first axis and the second axis, the third axis comprising an axis of rotation for the valve component;
 an inlet disposed on the first axis, and comprising an inlet lip that terminates in an inlet surface disposed parallel to the first axis, the inlet surface having a width less than a thickness of a wall adjacent to the inlet lip; and
 an outlet disposed on the first axis and fluidly coupled to an inlet by the fluid passage, and comprising an outlet lip that terminates in an outlet surface disposed parallel to the first axis, the outlet surface having a width less than a thickness of a wall adjacent to the outlet lip.

11. The valve component of claim 10, the respective external surface comprising a planar surface, and comprising one of:
 the internal surfaces respectively comprising a concave surface;
 the internal surfaces respectively comprising a convex surface; and
 the internal surfaces respectively comprising a planar surface.

12. The valve component of claim 10, the respective external surfaces comprising a concave surface, and comprising one of:
 the internal surfaces respectively comprising a concave surface;
 the internal surfaces respectively comprising a convex surface; and
 the internal surfaces respectively comprising a planar surface.

13. The valve component of claim 10, the respective-external surfaces and internal surfaces comprising a planar surface, and comprising one of:
 the internal surfaces respectively comprising a surface area that is less than a surface area of the respective external surfaces; and
 the internal surfaces respectively comprising a surface area that is greater than a surface area of the respective external surfaces.

14. The valve component of claim 10, the inlet disposed on the first axis, and comprising an inlet lip that terminates in an inlet surface disposed parallel to the first axis, the inlet surface having a width less than a thickness of a second wall adjacent to the inlet lip.

15. The device of claim 14, the inlet lip and the outlet lip respectively defined by an taper point and the corresponding lip surface, the taper point comprising a location on the corresponding wall that begins a taper toward the corresponding lip surface.

16. The valve component of claim 15, the respective inlet lip and outlet lip comprising a chamfer disposed on the inside portion of the respective lips between the taper point the corresponding lip surface.

17. A valve flow control device, comprising:
 a substantially spherically shaped profile;
 a first axis disposed along a direction of fluid flow;
 a second axis disposed perpendicular to the first axis;
 a third axis disposed along an axis of rotation, and perpendicular to the first axis and second axis;
 an annular fluid inlet lip, defining a fluid inlet that is fluidly coupled to a fluid outlet, the fluid inlet lip defined by an inlet inner surface adjacent to the fluid inlet and an inlet taper point comprising a point on an inlet wall that begins a taper toward to the inlet inner surface, the inlet inner surface disposed parallel to the first axis and comprising a width that is less than the inlet wall immediately adjacent to the inlet lip;
 an annular fluid outlet lip, defining the fluid outlet, the fluid outlet lip defined by an outlet inner surface adjacent to the fluid outlet and an outlet taper point comprising a point on an outlet wall that begins a taper toward to the outlet inner surface, the outlet inner surface disposed parallel to the first axis and comprising a width that is less than the outlet wall immediately adjacent to the outlet lip; and a first side and a second side respectively disposed on the second axis, the first side and second side respectively comprising an internal planar surface and an external planar surface, the external planar surfaces respectively:
  comprise a surface area greater than the surface area of the respective internal planar surfaces; or
  comprise a surface area less than the surface area of the respective internal planar surfaces.

\* \* \* \* \*